(12) United States Patent
Hochberg et al.

(10) Patent No.: US 10,154,011 B2
(45) Date of Patent: *Dec. 11, 2018

(54) SECURE DATA SHARING WITH PUBLICLY ACCESSIBLE COMPUTING NODES

(71) Applicant: Intel Corporation, Santa Clara, CA (US)

(72) Inventors: Yoav Hochberg, Haifa (IL); Glen J. Anderson, Beaverton, OR (US); Guy Ben Haim, Tel-Mond (IL); Charles C. Smith, Hillsboro, OR (US); Brian D. Johnson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 14/952,515

(22) Filed: Nov. 25, 2015

(65) Prior Publication Data

US 2016/0080325 A1 Mar. 17, 2016

Related U.S. Application Data

(63) Continuation of application No. 13/827,179, filed on Mar. 14, 2013, now Pat. No. 9,202,082.

(51) Int. Cl.
*H04L 29/06* (2006.01)
*G06F 21/62* (2013.01)
*H04W 12/06* (2009.01)

(52) U.S. Cl.
CPC .......... *H04L 63/04* (2013.01); *G06F 21/6245* (2013.01); *H04L 63/08* (2013.01);
(Continued)

(58) Field of Classification Search
CPC . G06F 21/57; G06F 7/04; G06F 21/55; G06F 17/30; G06F 15/16; H04W 12/06
(Continued)

(56) References Cited

U.S. PATENT DOCUMENTS 6,957,065 B1 * 10/2005 Lindholm ............... H04W 8/04
370/355
7,447,903 B2 11/2008 Sandhu
(Continued)

FOREIGN PATENT DOCUMENTS

CN 1596521 3/2005

OTHER PUBLICATIONS

International Searching Authority, "Notification of Transmittal of the International Search Report and the Written Opinion of the International Searching Authority," dated Jun. 26, 2014, in International application No. PCT/US2014/023869.
(Continued)

*Primary Examiner* — Thanhnga B Truong
(74) *Attorney, Agent, or Firm* — Trop, Pruner & Hu, P.C.

(57) ABSTRACT

An embodiment of the invention includes determining a first security status for first information and a second security status for second information, the second security status being more secure than the first security status; establishing a first communication path between the system and a first local computing node via a first wireless path; conveying the first information to the first local computing node via the first wireless path based on the first security status; and withholding the second information from the first local computing node based on the second security status; wherein the first and second information are stored on at least one of the system and a remotely located computing node. Other embodiments are described herein.

18 Claims, 4 Drawing Sheets

(52) U.S. Cl.
CPC .......... *H04L 63/083* (2013.01); *H04L 63/105* (2013.01); *H04L 63/1408* (2013.01); *H04W 12/06* (2013.01); *G06F 2221/2143* (2013.01)

(58) Field of Classification Search
USPC .............................. 726/1–3; 713/2; 455/433
See application file for complete search history.

(56) References Cited

U.S. PATENT DOCUMENTS

| | | |
|---|---|---|
| 7,506,368 B1 | 3/2009 | Kersey |
| 7,814,319 B2 | 10/2010 | Iwasaki |
| 8,214,645 B2 | 7/2012 | Brown |
| 8,621,588 B2 | 12/2013 | Yoshida |
| 8,712,455 B2 | 4/2014 | Gosset |
| 8,713,633 B2 | 4/2014 | Thomas |
| 9,124,621 B2 * | 9/2015 | Manadhata ............ G06F 21/552 |
| 9,397,989 B1 * | 7/2016 | Ramalingam ........... H04L 63/08 |
| 2003/0105719 A1 | 6/2003 | Berger |
| 2005/0005168 A1 | 1/2005 | Dick |
| 2007/0136466 A1 | 6/2007 | Etelapera |
| 2010/0280904 A1 | 11/2010 | Ahuja |
| 2012/0303652 A1 | 11/2012 | Tseng |
| 2013/0276120 A1 | 10/2013 | Dalcher |
| 2015/0052342 A1 * | 2/2015 | Jang ...................... G06F 21/575 |
| | | 713/2 |

OTHER PUBLICATIONS

State Intellectual Property Office of the People's Republic of China, First Office Action dated May 18, 2017 in Chinese Patent Application No. 201480008937.1.

Korea Intellectual Property Office, Notice of Preliminary Rejection dated Jun. 17, 2016 in Korean Patent Application No. 2015-7021995.

Berger, et al: "Using Symbiotic Displays to View Sensitive Information in Public", Pervasive Computing and Communications, 2005. PERCOM 2005. Third IEEE International Conference on Kauai Island, HI, USA Mar. 8-12, 2005, Piscataway, NJ, USA, IEEE, Mar. 8, 2005 (Mar. 8, 2005), pp. 139-148, XP010779648, DOI: 10.1109/PERCOM.2005.52, ISBN: 978-0-7695-2299-9 * the whole document *.

European Patent Office, Extended European Search Report dated Nov. 7, 2016 in European Patent Application No. 14774500.4.

European Patent Office, Office Action dated Mar. 15, 2017 in European Patent Application No. 14774500.4.

State Intellectual Property Office, Office Action dated Feb. 2, 2018 in Chinese patent application No. 201480008937.1.

European Patent Office, Communication pursuant to Article 94(3) EPC dated Oct. 9, 2018 in European Patent Application No. 14 774 500.4.

* cited by examiner

SECURE DATA SHARING WITH PUBLICLY ACCESSIBLE COMPUTING NODES

This application is a continuation of U.S. patent application Ser. No. 13/827,179, filed Mar. 14, 2013. The content of the above application is hereby incorporated by reference.

TECHNICAL FIELD

Various embodiments described herein generally relate to secure communication of information between computing nodes.

BACKGROUND

Computing nodes come in varied forms including, for example, Smartphones, Ultrabooks™, notebooks, tablets, laptops, personal computers, servers, personal digital assistants, cluster nodes, mobile computing nodes, and the like. A user may operate such a device to handle many types of information. For example, the user may operate the device to listen to music, capture and view photographs, compose and read text messages and email, read and edit word processing files, and the like. This information may be of varied sensitivity, security, or confidentiality. For example, the user may have posted some photos to a publically accessible social media web site and consequently not deem the photos confidential. However, other information, such as word processing documents and email, may be deemed highly confidential by the user.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

An embodiment includes a protocol for an automated and secure transfer of data (e.g., personal data) from a user's computing node to a public computing node, such as a publically accessible screen or display, based on the user's personal preference and/or usage behavior. For example, when a user is considering buying computing products he or she may visit a kiosk that includes such computing products. An embodiment allows the user to view his or her personal data on those computing products included in the kiosk. In one embodiment, this data may be shown on at least one of the computing products in the kiosk without logging on to any service. For example, the user's photographs stored on his or her Smartphone (which by rule or by previous designation are deemed as non-secure and suitable for public display) may be shown on other Smartphones that are for sale in the kiosk. The photos may be transferred (e.g., a copy of the photo is transferred) from the user's Smartphone to any of the kiosk Smartphones without requiring the user to log into a service, type in a password, and the like. However, the user's email (which by rule or by previous designation is deemed as secure and not suitable for public display) will not be displayed on the kiosk Smartphones (or at least not without user approval before doing so). As another example such a user may see his or her low-security data, such as movie tickets stored on his or her tablet, displayed on a public display located nearby the user and his or her tablet (e.g., in a kiosk of a theater lobby). However, secure voice messages, audio, and/video on the tablet will not be conveyed to the public terminal. As another example such a user may see his or her low-security data, such as digital coupons stored on his or her Smartphone, displayed on a cash register handling a sale of a product to the user (but secure word processing documents are not transferred).

Thus, various embodiments address the problem of having to enter passwords and the like to personalize an experience with a public computing node (e.g., seeing personal data on public display) when such security precautions are not warranted for non-confidential data (but are warranted for confidential data).

In an embodiment a user may be recognized through biometric detection. Such detection may include various modes of identifying a user based on his or her characteristics or traits. Example biometrics include retinal scanning, DNA, hand print, finger print, typing rhythm, gait, and voice recognition. Other methods of access control include non-biometric detection such as token-based identification systems (e.g., driver's license or passport) and/or knowledge-based identification systems (e.g., password or personal identification number).

An embodiment includes multiple levels of secure authentication. Such an embodiment may make low-security experiences happen readily so that the user could pick up a device and experience part of their customized experience (e.g., based on their use of other devices) without logging on. For example, the user may designate photos previously published to social media outlets (e.g., Facebook™, Twitter™) as "low security" and thus readily available to be posted on public displays without the need for logging on. However, the same user may designate email at a higher security state than the photos. The user may require password entry before the email is displayed on the screen. Thus, a user with a single Smartphone may visit a sales kiosk and quickly see her photos (stored on her Smartphone) displayed on sample Smartphones that are for sale in the kiosk. That same user may the visit a library with a public workstation. Once she is in proximity with the workstation (e.g., Bluetooth™ range) her photos may again be available for viewing on the display. However, her email account may also be visible as well upon her entering a password. In other embodiments, her general "inbox" of email may be accessible without need for logon while subfolders of previously stored emails may be accessible only after a password was entered. Accordingly, there are many levels of granularity for security profiles associated with conveying data/not conveying data to a public terminal.

Another embodiment is now described in conjunction with the aforementioned kiosk example where a user with a Smartphone visits a sales kiosk that includes several phones for sale or demonstration or general use. However, in this embodiment the user has registered with the service carrier for his phone (e.g., Verizon®) such that the service carrier gives the Smartphones in the kiosk permission to make the user's basic experience available to any device that detects the user. In an embodiment, a Smartphone in the kiosk (or a computer system included in the kiosk or comprising the kiosk) identifies the user through one or more of the aforementioned methods and then accesses the user's personal cloud and learns what settings and applications the user utilizes on a device similar to the form factor of the Smartphone for sale in the kiosk. The Smartphone in the kiosk then quickly loads data, such as a photos stored in a cloud-based photo storage system or preferred graphical user interface (GUI) settings regarding banners, icons, and the like, so the user can quickly begin working with the device in a manner pleasing and familiar to the user. If the user buys or leases the device, for example, the user can further the authentication between the kiosk Smartphone and the user's cloud and/or Smartphone so that the user's more sensitive data is available for viewing on the public display.

One embodiment includes automatically created "data profiles" that vary in their level of sensitivity. For example, text messages maybe the lowest level of sensitivity (e.g., a level that requires no password for access) and word processing documents (e.g., Microsoft Word® documents) may require password entry coupled with retinal scanning. Further, the word processing documents may be encumbered with digital rights management concerns providing they be shared only with licensed nodes. Other limitations may require that the user obtain permission to view, edit, copy, and/or print the document before transfer is allowed.

The user may eventually trust the embodiment to use, build, and/or edit the user's public data profile proactively. For example, the embodiment may designate, based on a user's past actions, photos as suitable for public display (or acceptance to a query asking whether photos are suitable for public display). The embodiment may proactively determine that access to the user's music should also be publically available. For example, a user may have songs stored locally on his Smartphone and those songs may be made available to a public node (e.g., Smartphone for sale in a kiosk, public terminal or workstation, and the like). However, the Smartphone may also convey credentials to the public node that may then be used by the public node to access music, such as songs or user defined radio stations that focus on a genre of music selected by the user. Such songs may be conveyed automatically on a conditional basis, such as whether the public node is included in a whitelist (accessible by the Smartphone) indicating the public node has a license (e.g., digital rights and/or copyrights) to accept the particular song or songs to be transferred. An embodiment may propose a set of data for a public profile (e.g., based on the user's behavior with the data such as the user posting the data on a publically available blog) and the user may have the option of approving that data profile for public display when the user is detected to be in proximity to a public node. Thus, an embodiment may include a software module that, as described above, automatically creates groupings of data (e.g., a low security group of photos and other data) that vary by sensitivity or security level (e.g., based on a user's daily behavior or prior feedback to the module regarding permission to display data) and sends the data to a public/non-user-owned device or screen when the user is detected.

While some embodiments described herein focus on one node, such as a Smartphone that is placed in proximity with a kiosk of other nodes, other embodiments include the kiosk or devices in the kiosk that detect the user's presence and then utilize automatic data transfer from the user to the kiosk device to help sell/lease the kiosk device. Other embodiments are described herein.

Figure 1:
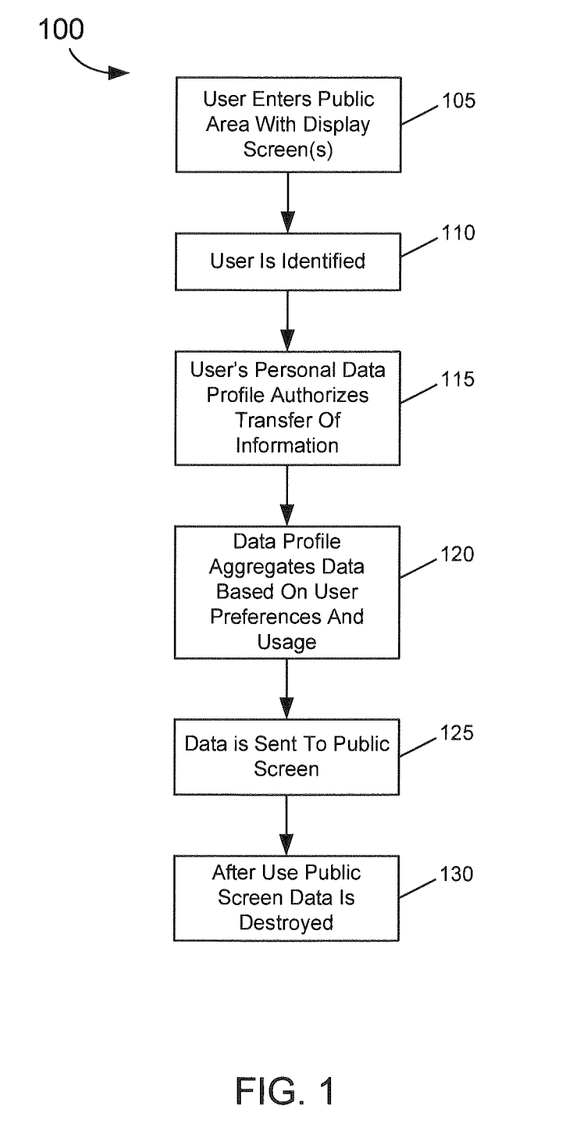
FIG. 1 includes a flow diagram for sharing user data in an embodiment of the invention.

FIG. 1 includes a flow diagram of a method 100 for sharing user data in an embodiment of the present invention.

In block 105 a user enters a public area that includes one or more display screens. Such a public area may include a kiosk with multiple computing nodes (e.g., mobile or stationary computing nodes), a library or airport or other public venue with publically accessible workstations, an office complex with workstations available to employees, an advertising system including a public display (e.g., a billboard system using one or more displays), and the like. While block 105 specifically states display screens are at issue, in other embodiments they need not be. For example, the user may enter an area that has audio nodes. For instance, a kiosk selling speakers, headphones, and/or headsets could allow for interaction with the user to play his or her favorite or selected audio from his or her computing node and/or cloud based data. Other examples include a transit depot with a waiting area with speakers available for users to play their music through. In other embodiments audio and video systems are incorporated to provide the user with both stimuli.

In block 110 the user is identified. For example, the user may be identified in a fairly anonymous way such as based on motion. In such a case a computing system coupled to any of the display screen(s) may then determine a user (albeit not necessarily any one user in particular) is in the vicinity of the computing system. However, in other embodiments the detection may be far less anonymous. For example, use of biometrics such as finger print or retinal scanning may positively identify the user to the computing system. The level of identification (e.g., anonymous versus specific identification) may later dictate what information, if any, will be made available for display. For example, a more definite identification of a user may allow for access to more securely designated data.

In block 115 a user's personal data profile may or may not authorize transfer of information from the user (e.g., the user's Smartphone or cloud-based account) to the computing system. For example, a user's profile may dictate that only a display node listed on a whitelist of nodes may have access to such information (and vice versa regarding forbidding transfer of information to a node that is blacklisted). The user's profile may have, in some embodiments, a proximity limit such that the display system must be within X cm of the user's device (e.g., Smartphone) before allowing data transfer between nodes. For example, the required proximity may be 2, 4, 6, 8, 10, 12, 15, 20, 25, 30 cm or more in various embodiments. In other embodiments the user's profile may allow the information to be transmitted to the display system. However, the transfer may be conditioned upon the display system satisfying security standards. For example, the user profile may insist on data being transferred between the two nodes after being encrypted with an encryption key of a certain standard. Such a profile may be useful to a user that does not mind having his or her information display publically but at the same time does not wish for the information to be sent to other nearby devices, such as a stranger's Smartphone that would possibly allow the stranger to permanently store the information. In one example, the condition may be that the display node participates in a public key infrastructure (PKI) system whereby the user can rely on certificate-based authentication for the display node before inter-node data transfer occurs.

In block 120 the user's data profile aggregates data based on user preferences and usage. This block may be located at other locations within flow 100 (or even independent of flow 100) as it may be an operation that runs, for example, continuously in the background. This aggregation may occur in many ways such as, for example, when a user takes a photograph with her tablet the profile may prompt the user to determine if she wishes to classify the availability of the photograph. For example, the user may designate the photograph as "level 1" such that when the user is proximate a public display the photograph is readily available for display. However, the photograph may instead be designated "level 2" whereby it is only available to a public display after the user provides a password. In an embodiment the photograph may be designated by the user as "level2a" whereby the photograph is available without a password if the two computer nodes are within, for example, 5 cm of one another but otherwise a password is needed.

In some embodiments the aggregation may instead occur, as discussed above, based on rules (e.g., user defined rules or standard rules) that dictate once the user posts the photograph publically at a first level then the photograph is now designated as "level 1" such that when the user is proximate a public display the photograph is readily available for display. For example, posting the photograph on a publically accessible blog (or social media site that has access not limited to certain members such as the user's friends and family) may automatically designate the photograph as "level 1" but sharing the photograph on a social media site that has access limited to certain members such as the user's friends and family may result in categorizing the photo as "level 2" whereby it is only available to a public display after the user provides a password.

In block 125 data is sent to the public screen system. In block 130, after the data is shown on the screen the data is destroyed. For example, a file including a photo and/or audio may be sent to the public computing system. Once the file is opened the data may be set to expire after there is no longer an active communicative coupling between the user's system and the pubic system. In one embodiment such coupling can be determined based on, for example, issuance of a heartbeat signal every Y seconds (e.g., 10 seconds). In other embodiments once the file is opened the data may be set to expire after Z seconds (e.g., 10, 30, 60, 90 seconds). For example, the data exchanged between the user and display systems may be a URL whereby after the URL is viewed once the URL is no longer valid. Another example may be based on digital rights management (DRM) technology whereby an encryption key prevents the receiver from printing or sending the information to other people. Other DRM-based examples include rotating or alternating key schemes whereby a key alternates every so many seconds/minutes such that failure for the public system to determine subsequent keys (after being provided the initial key by the user's system) would render the user's information no longer accessible. Such key schemes are described in detail within, for example, U.S. Pat. No. 8,161,564 assigned to Intel® Corporation (Santa Clara, Calif., US).

Figure 2:
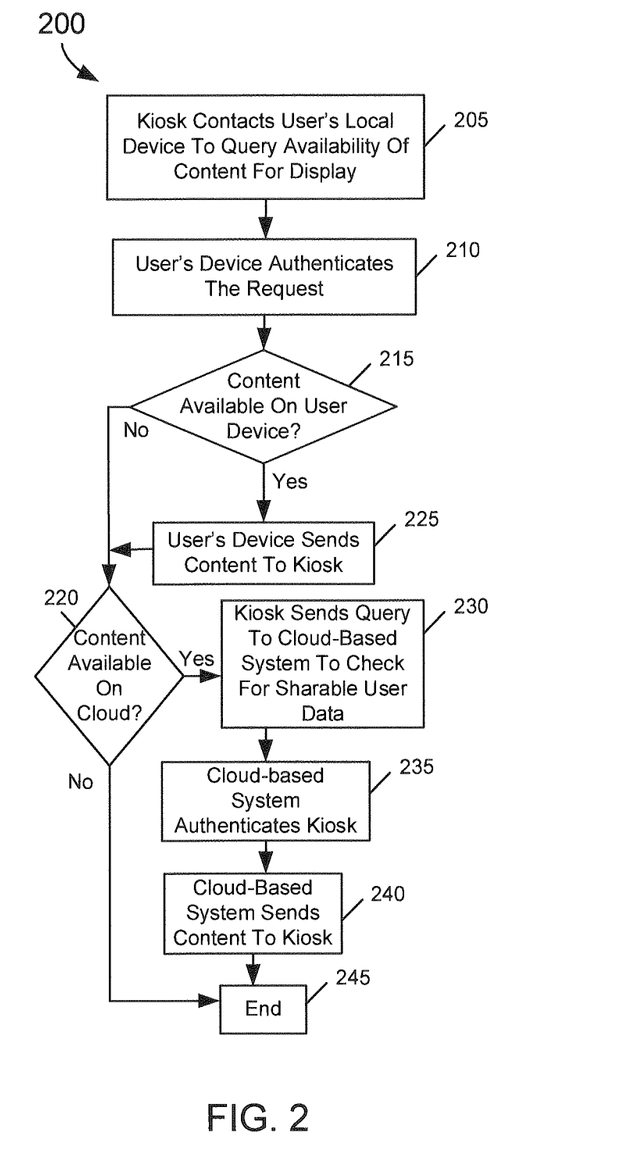
FIG. 2 includes a flow diagram for sharing user data in an embodiment of the present invention.

FIG. 2 includes a flow diagram of a method 200 for sharing user data in an embodiment of the present invention. Method 200 concerns an example situation where a kiosk computing node is coupled to several different Smartphones that are being sold from the kiosk. A user himself has a Smartphone and will engage with the kiosk computing node so the user can he see photos, email, texts, and/or documents stored on his Smartphone (and/or stored in the cloud) on at least one of the Smartphones in the kiosk.

In block 205 the kiosk computing node contacts the user's local device to query the availability of content for display. For example, this may entail the kiosk computing node sending a passcode to the user device. Such a passcode may include a digital certificate for the kiosk computing node's public key, which the user device may then use in a PKI encryption system to authenticate the request and communicate securely between the two nodes (block 210). In an embodiment the passcode may facilitate a security "handshake" between the devices. The handshake may, for example, include a Bluetooth™ protocol for authentication between the two (or more) nodes. In an embodiment a public node (e.g., kiosk) may query or "ping" a nearby user's mobile communications node (e.g., cellular phone) to share the user's data, but if the "ping" is not preceded or accompanied by a secure code during the Bluetooth™ authentication process the user node will not share content with the public node, or will ask the user for permission to do so, or may only share content having a low security threshold (e.g., songs) and withhold content having a higher security threshold (e.g., email).

Diamond 215 determines whether content is available on the user device. If no, method 200 proceeds to diamond 220 to determine whether content corresponding to the user is available on the cloud. If no, the process ends in block 245. However, returning to diamond 215, if there is content available on the user's device then in block 225 the user's device sends content to the kiosk. For example, the user's device may send content to a computing node in the kiosk that couples to multiple Smartphones in the kiosk. The kiosk node may itself determine which, if any, of the Smartphones will receive the information (e.g., photos). However, in other embodiments the user may have greater influence in the matter. For example, the kiosk may determine which of the kiosk Smartphones is closest in proximity to the user's node and then route the information only to the closest kiosk Smartphone. Proximity sensing may be performed via, for example, infrared or ultrasonic proximity sensors in the kiosk and/or user Smartphones.

Returning to block 220, if the user data or information is cloud-based then in block 230 the kiosk sends a query to the cloud-based system to check for sharable user data. This may be performed using credentials securely transferred from the user's node to the kiosk using the kiosk's public key or some symmetric key securely passed between the two nodes. In block 235 the cloud-based system authenticates the kiosk based on the credentials and in block 240 the cloud-based system sends content to the kiosk. The cloud-based system may be, for example, a photo sharing site or the like.

Figure 3:
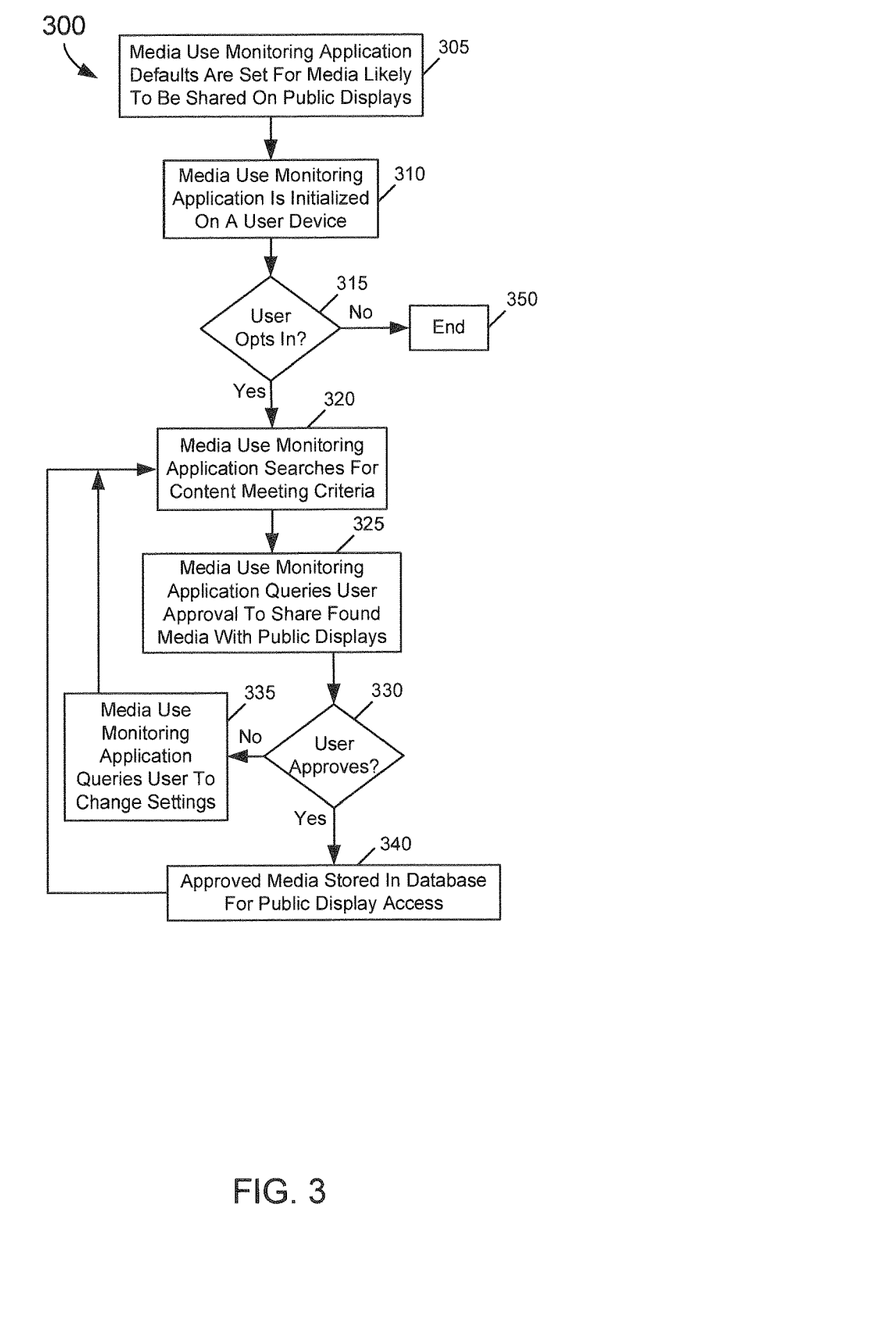
FIG. 3 includes a flow diagram for determining which user data may or may not be shared with other computing devices in an embodiment of the invention.

FIG. 3 includes a flow diagram of a method 300 for determining which user data may be shared with other computing devices in an embodiment of the present invention. In block 305 media use monitoring application defaults are set for media likely to be shared on public displays. For example, a default may be based on rules that dictate once the user posts the photograph publically at a first level then the photograph is now designated as "level 1" such that when the user is proximate a public display the photograph is readily available for display. Other exemplary settings are discussed above in regard to FIG. 1, block 120.

In block 310 the media use monitoring application is initialized on a user device. In diamond 315 the user opts in or declines to do so (which leads to ending the method in block 350). If the user does opt in, in block 320 the media use monitoring application searches for content meeting criteria/satisfying its rules. This may entail scouring past postings in social media (e.g., Facebook®), blogs, and the like. In one embodiment block 325 is included (but is not included in other embodiments) whereby the media use monitoring application queries user approval to share found media with public displays. Thus, rules may make decisions (see block 320) that are overridden or at least challenged in block 325. Based on the user's reply the rules may be updated using, for example, artificial intelligence pattern detection whereby a user's continued rejection of availability of photos concerning small humans (e.g., kids) or individuals designated as certain individuals (e.g., photos of the user's children that are tagged as such) may be used to adapt the rules.

In diamond 330 the user approves/disapproves the query of block 325. If disapproval then in block 335 the media use monitoring application queries the user to change settings (or artificial intelligence may operate as noted above). However, if there is approval then in block 340 approved media is stored in a database (local or remote/cloud based) for public display access.

Figure 4:
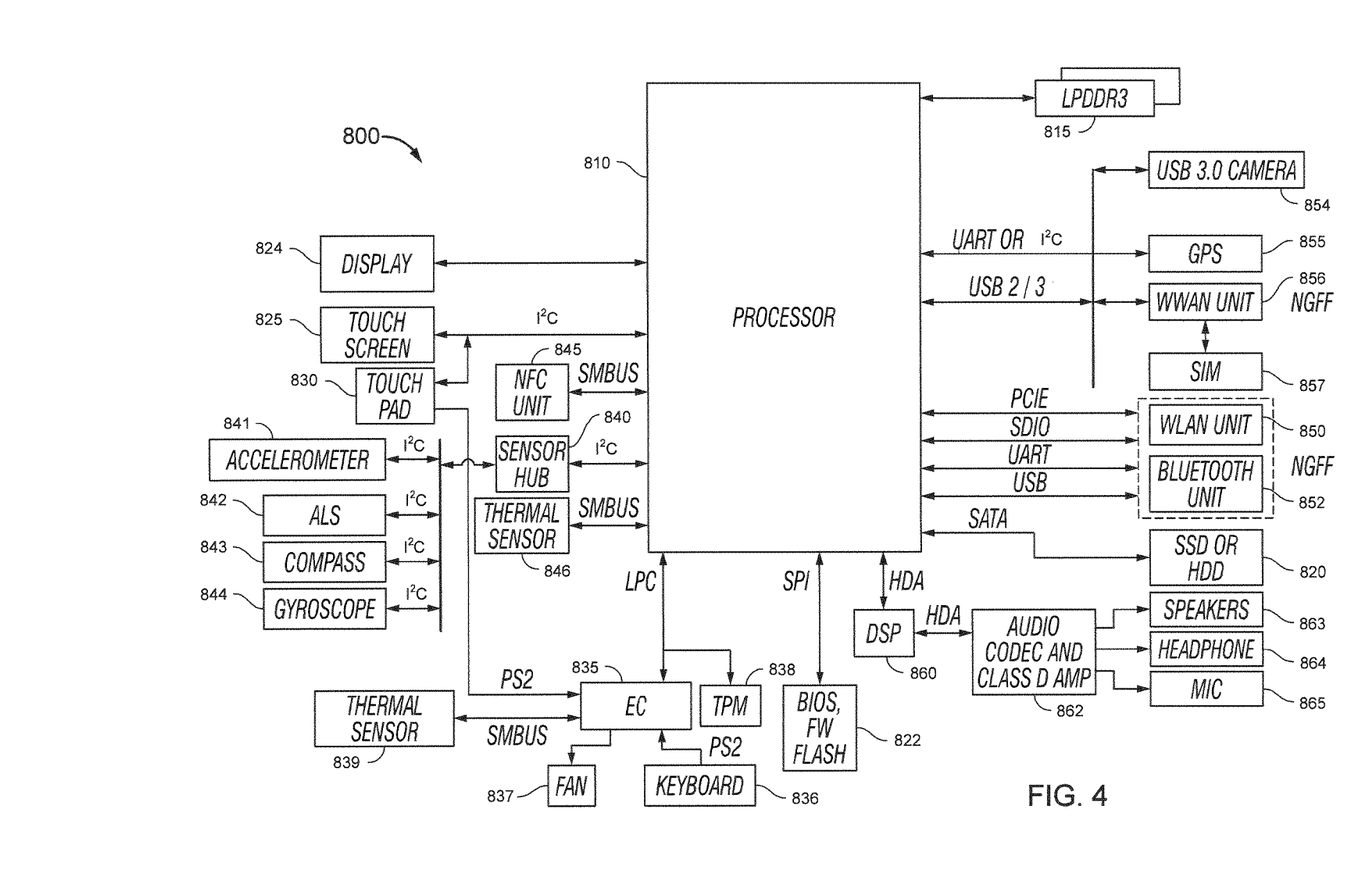
FIG. 4 is a block diagram of components present in a computer system in accordance with an embodiment of the invention.

FIG. 4 is a block diagram of components present in a computer system in accordance with an embodiment of the present invention. Referring now to FIG. 4, shown is a block diagram of components present in a computer system in accordance with an embodiment of the present invention. Such a system may be used in any of the nodes described herein such as kiosk nodes, Smartphones, tablets, mobile computing nodes, servers, and the like. As shown in FIG. 4, system 800 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that the block diagram of FIG. 4 is intended to show a high level view of many components of the computer system. However, it is to be understood that additional components may be present in certain implementations and furthermore, different arrangement of the components shown may occur in other implementations.

As seen in FIG. 4, a processor 810, which may be a low power multicore processor socket such as an ultra low voltage processor, may act as a main processing unit and central hub for communication with the various components of the system. Such processor can be implemented as a system on a chip (SoC) as described herein. In one embodiment, processor 810 may be an Intel® Architecture Core™-based processor such as an i3, i5, i7 or another such processor available from Intel Corporation, Santa Clara, Calif., such as a processor that combines one or more Core™-based cores and one or more Intel® ATOM™-based cores to thus realize high power and low power cores in a single SoC. However, understand that other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments such as an Apple A5 or A6 processor.

Processor 810 may communicate with a system memory 815, which in an embodiment can be implemented via multiple memory devices to provide for a given amount of system memory. To provide for persistent storage of information such as data, applications, one or more operating systems and so forth, a mass storage 820 may also couple to processor 810. Also shown in FIG. 4, a flash device 822 may be coupled to processor 810 (e.g., via a serial peripheral interface (SPI)). This flash device may provide for non-volatile storage of system software, including a basic input/output software (BIOS) as well as other firmware of the system.

Various input/output (IO) devices may be present within system 800. Specifically shown in the embodiment of FIG. 4 is a display 824 which may be a high definition LCD or LED panel configured within a lid portion of the chassis. This display panel may also provide for a touch screen 825, e.g., adapted externally over the display panel such that via a user's interaction with this touch screen, user inputs can be provided to the system to enable desired operations (e.g., with regard to the display of information, accessing of information and so forth). In one embodiment, display 824 may be coupled to processor 810 via a display interconnect that can be implemented as a high performance graphics interconnect. Touch screen 825 may be coupled to processor 810 via another interconnect, which in an embodiment can be an I²C interconnect. As further shown in FIG. 4, in addition to touch screen 825, user input by way of touch can also occur via a touch pad 830 which may be configured within the chassis and may also be coupled to the same I²C interconnect as touch screen 825.

For perceptual computing and other purposes, various sensors may be present within the system and can be coupled to processor 810 in different manners. Certain inertial and environmental sensors may couple to processor 810 through a sensor hub 840, e.g., via an I2C interconnect. In the embodiment shown in FIG. 4, these sensors may include an accelerometer 841, an ambient light sensor (ALS) 842, a compass 843 and a gyroscope 844. Other environmental sensors may include one or more thermal sensors 846 which may couple to processor 810 via a system management bus (SMBus) bus, in one embodiment.

Also seen in FIG. 4, various peripheral devices may couple to processor 810 via a low pin count (LPC) interconnect. In the embodiment shown, various components can be coupled through an embedded controller 835. Such components can include a keyboard 836 (e.g., coupled via a PS2 interface), a fan 837, and a thermal sensor 839. In some embodiments, touch pad 830 may also couple to EC 835 via a PS2 interface. In addition, a security processor such as a trusted platform module (TPM) 838 in accordance with the Trusted Computing Group (TCG) TPM Specification Version 1.2, dated Oct. 2, 2003, may also couple to processor 810 via this LPC interconnect.

System 800 can communicate with external devices in a variety of manners, including wirelessly. In the embodiment shown in FIG. 4, various wireless modules, each of which can correspond to a radio configured for a particular wireless communication protocol, are present. One manner for wireless communication in a short range such as a near field may be via a near field communication (NFC) unit 845 which may communicate, in one embodiment with processor 810 via a SMBus. Note that via this NFC unit 845, devices in close proximity to each other can communicate. For example, a user can enable system 800 to communicate with another portable device such as a Smartphone of the user via adapting the two devices together in close relation and enabling transfer of information such as identification information payment information, data such as image data or so forth. Wireless power transfer may also be performed using a NFC system.

As further seen in FIG. 4, additional wireless units can include other short range wireless engines including a WLAN unit 850 and a Bluetooth unit 852. Using WLAN unit 850, Wi-Fi™ communications in accordance with a given Institute of Electrical and Electronics Engineers (IEEE) 802.11 standard can be realized, while via Bluetooth unit 852, short range communications via a Bluetooth protocol can occur. These units may communicate with processor 810 via, for example, a USB link or a universal asynchronous receiver transmitter (UART) link. Or these units may couple to processor 810 via an interconnect via a Peripheral Component Interconnect Express™ (PCIe™) protocol in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the next generation form factor (NGFF) connectors adapted to a motherboard.

In addition, wireless wide area communications (e.g., according to a cellular or other wireless wide area protocol) can occur via a WWAN unit 856 which in turn may couple to a subscriber identity module (SIM) 857. In addition, to enable receipt and use of location information, a GPS module 855 may also be present. Note that in the embodiment shown in FIG. 4, WWAN unit 856 and an integrated capture device such as a camera module 854 may communicate via a given USB protocol such as a USB 2.0 or 3.0 link, or a UART or I2C protocol. Again the actual physical connection of these units can be via adaptation of a NGFF add-in card to an NGFF connector configured on the motherboard.

To provide for audio inputs and outputs, an audio processor can be implemented via a digital signal processor (DSP) 860, which may couple to processor 810 via a high definition audio (HDA) link. Similarly, DSP 860 may communicate with an integrated coder/decoder (CODEC) and amplifier 862 that in turn may couple to output speakers 863 which may be implemented within the chassis. Similarly, amplifier and CODEC 862 can be coupled to receive audio inputs from a microphone 865 which in an embodiment can be implemented via dual array microphones to provide for high quality audio inputs to enable voice-activated control of various operations within the system. Note also that audio outputs can be provided from amplifier/CODEC 862 to a headphone jack 864. Although shown with these particular components in the embodiment of FIG. 4, understand the scope of the present invention is not limited in this regard.

While FIG. 4 includes display 824, other nodes or systems for use with embodiments of the invention do not necessarily include a display and/or I/O display. Such a device lacking a display may still interact with, for example, another node having a display. The device lacking the display may still convey information to the node having the display and the information may still be displayed on the display. In fact, the system may lack displays for either the node delivering the information or the node receiving the information. The node receiving the information may convert the information into audio (e.g., reading aloud text transferred between the nodes), simply store the information (e.g., to perform automatic archiving for a user), and the like. The display in question may be a heads up display, hologram, and the like.

Embodiments may be implemented in code and may be stored on a machine readable storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following examples pertain to further embodiments.

Example 1 includes at least one storage medium having instructions stored thereon for causing a system to: determine a first security status for first information and a second security status for second information, the second security status being more secure than the first security status; establish a first communication path between the computing system and a first local computing node via a first wireless path; convey the first information to the first local computing node based on the first security status; and withhold the second information from the first local computing node based on the second security status; wherein the first and second information are stored on at least one of the system and a remotely located computing node.

In Example 2, the subject matter of Example 1 can optionally include instructions to: determine the first information was previously communicated via one of a predetermined group of social media outlets; and determine the first security status for the first information based on the determining the first information was previously communicated via one of a predetermined group of social media outlets.

In Example 3, the subject matter of Examples 1-2 can optionally include instructions to: determine the first security status for the first information in response to the first information satisfying a first user defined setting but not a second user defined setting; and determine the second security status for the second information in response to the second information satisfying the second user defined setting.

In Example 4, the subject matter of Examples 1-3 can optionally include instructions to: establish a second communication path between the system and a second local computing node via a second wireless path; and convey the second information to the second local computing node based on the second security status.

In Example 5, the subject matter of Examples 1-4 can optionally include the second information being accessible to the second local computing node for only a predetermined amount of time based on the second security status.

In Example 6, the subject matter of Examples 1-5 can optionally include the predetermined amount of time being based on when the second information is accessed by the second local computing node.

In Example 7, the subject matter of Examples 1-6 can optionally include instructions to: determine a first node security status for the first local computing node; and convey the first information to the first local computing node based on the first node security status.

In Example 8, the subject matter of Examples 1-7 can optionally include instructions to determine the first node security status based on determining at least one of (a) a proximity between the first local computing node and the system; (b) an encryption level to be used for conveying the first information to the first local computing node; (c) whether the first local computing node is blacklisted; and (d) whether the first local computing node is whitelisted.

In Example 9, the subject matter of Examples 1-8 can optionally at least one of the first and second information including security credentials for the remotely located computing node.

In Example 10, the subject matter of Examples 1-9 can optionally instructions to: determine the first security status corresponds to third information based on having earlier determined the first security status for the first information; wherein the third information was stored on at least one of the system and the remotely located computing node before the first information was stored on the at least one of the system and a remotely located computing node.

Example 11 includes at least one storage medium having instructions stored thereon for causing a system to: (a)(i) establish a first communication path between the system and a first local computing node via a first wireless path; (a)(ii) receive first information from at least one of the first local computing node and a remote computing node based on a first security status for the first information; and (a)(iii) display the first information; and (b)(i) establish a second communication path between the system and a second local computing node via a second wireless path; (b)(ii) receive second information from at least one of the second local computing node, the remote computing node, and another remote computing node based on a second security status for the second information; and (b)(iii) display the second information; wherein first local computing node corresponds to a first user and the second local computing node corresponds to a second user.

In Example 12, the subject matter of Example 11 can optionally include instructions to: query the first local computing node; and determine whether the first local computing node includes the first information based on querying the first local computing node.

In Example 13, the subject matter of Examples 11-12 can optionally include instructions to: authenticate the system to the first and second local computing nodes; and receive the first and second information based on authenticating the system to the first and second local computing nodes.

In Example 14, the subject matter of Examples 11-13 can optionally include the first information including at least one of pictures, email, audio, and video.

In Example 15, the subject matter of Examples 11-14 can optionally include instructions to delete the first and second information after displaying the first and second information.

In Example 16, the subject matter of Examples 11-15 can optionally include instructions to: identify a presence of at least one of a user of the first local computing node and the first computing node; and establish the first and second communication paths based on the identifying a presence of at least one of a user of the first local computing node and the first computing node.

Example 17 includes a method executed by at least one processor comprising: determining a first security status for first information and a second security status for second information, the second security status being more secure than the first security status; establishing a first communication path between the computing system and a first local computing node via a first wireless path; conveying the first information to the first local computing node based on the first security status; and withholding the second information from the first local computing node based on the second security status; wherein the first and second information are stored on at least one of the system and a remotely located computing node.

In Example 18, the subject matter of Example 17 can optionally include determining the first information was previously communicated via one of a predetermined group of social media outlets; and determining the first security status for the first information based on the determining the first information was previously communicated via one of a predetermined group of social media outlets.

In Example 19, the subject matter of Examples 17-18 can optionally include establishing a second communication path between the system and a second local computing node via a second wireless path; and conveying the second information to the second local computing node based on the second security status.

In Example 20, the subject matter of Examples 17-19 can optionally include determining the first security status corresponds to third information based on having earlier determined the first security status for the first information; wherein the third information was stored on at least one of the system and the remotely located computing node before the first information was stored on the at least one of the system and a remotely located computing node.

An example includes means for performing the instructions of any one of Examples 1 to 10 or Examples 11 to 16.

An example includes a communications device arranged to carry out the instructions according to any one of Examples 1 to 10 or Examples 11 to 16.

An example includes an apparatus arranged to carry out the instructions according to any one of Examples 1 to 10 or Examples 11 to 16.

All features and instructions of Examples 1 to 10 or Examples 11 to 16 may also be implemented with respect to a method or process described herein.

An example includes at least one machine readable medium comprising a plurality of instructions that in response to being executed on a computing device, cause the computing device to carry out a method according to any one of Examples 17 to 20.

An example includes means for performing the method of any one of Examples 17 to 20.

An example includes a communications device arranged to carry out the method according to any one of Examples 17 to 20.

An example includes an apparatus arranged to carry out the method according to any one of Examples 17 to 20.

Example 21 includes a method executed by at least one processor comprising: determining a first security status for first information and a second security status for second information, the second security status being more secure than the first security status; establishing a first communication path between the computing system and a first local computing node via a first wireless path; conveying the first information to the first local computing node based on the first security status; and withholding the second information from the first local computing node based on the second security status; wherein the first and second information are stored on at least one of the system and a remotely located computing node.

In Example 22 the subject matter of Example 21 can optionally include determining the first information was previously communicated via one of a predetermined group of social media outlets; and determining the first security status for the first information based on the determining the first information was previously communicated via one of a predetermined group of social media outlets.

In Example 23 the subject matter of Examples 21 and higher can optionally include determining the first security status for the first information in response to the first information satisfying a first user defined setting but not a second user defined setting; and determining the second security status for the second information in response to the second information satisfying the second user defined setting.

In Example 24 the subject matter of Examples 21 and higher can optionally include establishing a second communication path between the system and a second local computing node via a second wireless path; and conveying the second information to the second local computing node based on the second security status. The second information may be accessible to the second local computing node for only a predetermined amount of time based on the second security status. The predetermined amount of time may be based on when the second information is accessed by the second local computing node.

In Example 25 the subject matter of Examples 21 and higher can optionally include determining a first node security status for the first local computing node; and conveying the first information to the first local computing node based on the first node security status. In addition determining the first node security status based on determining at least one of (a) a proximity between the first local computing node and the system; (b) an encryption level to be used for conveying the first information to the first local computing node; (c) whether the first local computing node is blacklisted; and (d) whether the first local computing node is whitelisted.

In Example 26 the subject matter of Examples 21 and higher can optionally include at least one of the first and second information including security credentials for the remotely located computing node.

In Example 27 the subject matter of Examples 21 and higher can optionally include determining the first security status corresponds to third information based on having earlier determined the first security status for the first information; wherein the third information was stored on at least one of the system and the remotely located computing node before the first information was stored on the at least one of the system and a remotely located computing node.

Example 28 includes a method executed by at least one processor comprising: (a)(i) establishing a first communication path between the system and a first local computing node via a first wireless path; (a)(ii) receiving first information from at least one of the first local computing node and a remote computing node based on a first security status for the first information; and (a)(iii) displaying the first information; and (b)(i) establishing a second communication path between the system and a second local computing node via a second wireless path; (b)(ii) receiving second information from at least one of the second local computing node, the remote computing node, and another remote computing node based on a second security status for the second information; and (b)(iii) displaying the second information; wherein the first local computing node corresponds to a first user and the second local computing node corresponds to a second user.

In Example 29 the subject matter of Example 28 can optionally include querying the first local computing node; and determining whether the first local computing node includes the first information based on querying the first local computing node.

In Example 30 the subject matter of Examples 28 and higher can optionally include authenticating the system to the first and second local computing nodes; and receiving the first and second information based on authenticating the system to the first and second local computing nodes.

In Example 31 the subject matter of Examples 28 and higher can optionally include the first information including at least one of pictures, email, audio, and video.

In Example 32 the subject matter of Examples 28 and higher can optionally include instructions to delete the first and second information after displaying the first and second information.

In Example 33 the subject matter of Examples 28 and higher can optionally include identifying a presence of at least one of a user of the first local computing node and the first computing node; and establishing the first and second communication paths based on the identifying a presence of at least one of a user of the first local computing node and the first computing node.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one storage medium having instructions stored thereon for causing a mobile first computing node to:
    determine security states for the first computing node and first information;
    in response to determining the security states, convey the first information to a local mobile second computing node via a wireless path without receiving security credentials from a user of the first computing node at any point within a first time period;
    determine second information satisfies a defined setting;
    in response to determining the second information satisfies the defined setting, determine a security state for the second information;
    receive security credentials from the user during a second time period; and
    in response to receiving the security credentials and to determining the security states for the first computing node and the second information, convey the second information to the second computing node via the wireless path;
    wherein (a) the first time period extends from the determining the security state of the first computing node to the conveying the first information, and (b) the second time period extends from the determining the security state of the first computing node to the conveying the second information.

2. The at least one medium of claim 1 comprising instructions to cause the second computing node to grant the user access to the first and second information in response to receiving the security credentials and to determining the security states for the first computing node, the first information, and the second information.

3. The at least one medium of claim 2, wherein the causing the second computing node to grant the user access to the first and second information includes displaying the first and second information.

4. The at least one medium of claim 1, wherein the first information includes a member selected from the group comprising music, photos, text messages, e-mail, audio, or a visual graphic and the second information includes another member selected from the group comprising music, photos, text messages, e-mail, audio, or a visual graphic.

5. The at least one medium of claim 1, wherein the security credentials include at least one of a biometric for the user, a password, or an encryption key.

6. The at least one medium of claim 1, wherein the second computing node includes a member selected from the group comprising: Smartphones, notebooks, tablets, laptops, personal computers, servers, or personal digital assistants.

7. The at least one medium of claim 1 comprising instructions to:
determine the security state for the first information in response to the first information satisfying an additional defined setting but not the defined setting.

8. The at least one medium of claim 1, wherein the second information is accessible to the second local computing node for only a predetermined amount of time.

9. The at least one medium of claim 1 comprising instructions to determine the security state for the first computing node based on determining at least one of (a) a proximity between the first and second computing nodes; or (b) an encryption level to be used for conveying the first information to the second computing node.

10. An apparatus comprising:
at least one memory and at least one processor, to couple to the at least one memory, to cause a first computing node to:
determine security states for the first computing node and first information;
in response to determining the security states, convey the first information to a local mobile second computing node via a wireless path without receiving security credentials from a user of the first computing node at any point within a first time period;
determine second information satisfies a defined setting;
in response to determining the second information satisfies the defined setting, determine a security state for the second information;
receive security credentials from the user during a second time period; and
in response to receiving the security credentials and to determining the security states for the first computing node and the second information, convey the second information to the second computing node via the wireless path;
wherein (a) the first time period extends from the determining the security state of the first computing node to the conveying the first information, and (b) the second time period extends from the determining the security state of the first computing node to the conveying the second information.

11. The apparatus of claim 10, wherein the at least one processor is to cause the second computing node to grant the user access to the first and second information in response to receiving the security credentials and to determining the security states for the first computing node, the first information, and the second information.

12. The apparatus of claim 11, wherein the causing the second computing node to grant the user access to the first and second information includes displaying the first and second information.

13. The apparatus of claim 10, wherein the first information includes a member selected from the group comprising music, photos, text messages, e-mail, audio, or a visual graphic and the second information includes another member selected from the group comprising music, photos, text messages, e-mail, audio, or a visual graphic.

14. The apparatus of claim 10, wherein the security credentials include at least one of a biometric for the user, a password, or an encryption key.

15. The apparatus of claim 10, wherein the second computing node includes a member selected from the group comprising: Smartphones, notebooks, tablets, laptops, personal computers, servers, or personal digital assistants.

16. The apparatus of claim 10 wherein the at least one processor is to:
determine the security state for the first information in response to the first information satisfying an additional defined setting but not the defined setting.

17. The apparatus of claim 10, wherein the second information is accessible to the second local computing node for only a predetermined amount of time.

18. The apparatus of claim 10 wherein the at least one processor is to determine the security state for the first computing node based on determining at least one of (a) a proximity between the first and second computing nodes; or (b) an encryption level to be used for conveying the first information to the second computing node.

* * * * *